(12) United States Patent
Park et al.

(10) Patent No.: US 11,384,191 B2
(45) Date of Patent: *Jul. 12, 2022

(54) BLOCK COPOLYMER CONTAINING PHOTO-SENSITIVE MOIETY

(71) Applicant: LG Chem, Ltd., Seoul (KR)

(72) Inventors: No Jin Park, Daejeon (KR); Jin Kon Kim, Gyeongsangbuk-do (KR); Chung Ryong Choi, Gyeongsangbuk-do (KR); Sung Soo Yoon, Daejeon (KR)

(73) Assignee: LG Chem, Ltd.

( * ) Notice: Subject to any disclaimer, the term of this patent is extended or adjusted under 35 U.S.C. 154(b) by 26 days.

This patent is subject to a terminal disclaimer.

(21) Appl. No.: 16/964,064

(22) PCT Filed: Jan. 23, 2019

(86) PCT No.: PCT/KR2019/000947
§ 371 (c)(1),
(2) Date: Jul. 22, 2020

(87) PCT Pub. No.: WO2019/147009
PCT Pub. Date: Aug. 1, 2019

(65) Prior Publication Data
US 2021/0047455 A1 Feb. 18, 2021

(30) Foreign Application Priority Data

Jan. 26, 2018 (KR) .................. 10-2018-0010050

(51) Int. Cl.
*C08F 293/00* (2006.01)
*C08J 5/18* (2006.01)

(52) U.S. Cl.
CPC .......... *C08F 293/005* (2013.01); *C08J 5/18* (2013.01); *C08F 2438/03* (2013.01); *C08J 2325/08* (2013.01)

(58) Field of Classification Search
CPC .... C08J 2300/206; C08J 3/28; C08F 2810/10; C08F 293/005; C08F 293/00; C08F 299/02; B01D 71/80
See application file for complete search history.

(56) References Cited

U.S. PATENT DOCUMENTS

| 2013/0224442 A1 | 8/2013 | Kim et al. |
| 2015/0056158 A1 | 2/2015 | Gunatillake et al. |
| 2015/0232596 A1 | 8/2015 | Fornof et al. |
| 2019/0269790 A1* | 9/2019 | Li .................. A61P 11/00 |

FOREIGN PATENT DOCUMENTS

| CN | 104254581 A | 12/2014 |
| CN | 104379637 A | 2/2015 |
| GB | 2007686 A | 5/1979 |
| JP | 2015509129 A | 3/2015 |
| KR | 20130050874 A | 5/2013 |
| KR | 20140127299 A | 11/2014 |
| KR | 20140142340 A | 12/2014 |
| WO | 2017058676 A1 | 4/2017 |

OTHER PUBLICATIONS

Extended European Search Report for Application No. 19743305.5, dated Apr. 6, 2021, 6 pages.
International Search Report for Application No. PCT/KR2019/000947 dated May 8, 2019, 2 pages.
Taiwan Search Report for Application No. 108102713 dated May 12, 2020, 1 page.
Topham, et al., "The performance of poly(styrene)-block-poly(2-vinyl pyridine)-block-poly(styrene) triblock copolymers as pH-driven actuators," Soft Matter—The Royal Society of Chemistry, Oct. 15, 2007, pp. 1506-1512, vol. 3, No. 12.

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

A block copolymer and a use thereof are disclosed herein. The block copolymer of the present application may have excellent self-assembly properties or phase separation characteristics and simultaneously have characteristics capable of changing the self-assembly structure formed once, or provide a block copolymer capable of forming a pattern of phase separation structures in a polymer membrane.

15 Claims, 10 Drawing Sheets

BLOCK COPOLYMER CONTAINING PHOTO-SENSITIVE MOIETY

CROSS REFERENCE TO RELATED APPLICATIONS

The present application is a national stage entry under 35 U.S.C. § 371 of International Application No. PCT/KR2019/000947 filed on Jan. 23, 2019, which claims priority to Korean Patent Application No. 10-2018-0010050 filed on Jan. 26, 2018, the disclosures of which are incorporated herein by reference in their entirety.

TECHNICAL FIELD

The present application relates to a block copolymer containing a photo-sensitive moiety.

BACKGROUND ART

The block copolymer has a molecular structure in which polymer blocks having different chemical structures are linked via covalent bonds. The block copolymer can form a periodically arranged structure such as a sphere, a cylinder, a gyroid or a lamella by phase separation. The domain size of the structure formed by a self-assembly phenomenon of the block copolymer can be widely controlled and various types of structures can be manufactured, so that the block copolymer can be applied to high density magnetic storage media, nanowire fabrication, various next-generation nanodevices such as quantum dots or metal dots or magnetic recording media, or pattern formation by lithography, and the like.

DISCLOSURE

Technical Problem

The present application provides a block copolymer and a use thereof.

Technical Solution

The present application relates to a block copolymer. In the present application, the term block copolymer is a copolymer in a form where two polymer segments different from each other are linked by a covalent bond.

The block copolymer may include a first polymer segment, a second polymer segment and a third polymer segment. The block copolymer may have a star-like structure that the three polymer segments are covalently bonded to one connecting point while sharing the connecting point, a linker connecting at least one polymer segment of the three polymer segments to the connecting point is a cleavable linker, and at least one of the first to third polymer segments includes a vinylpyridine.

In the present application, the fact that two kinds of polymer segments are identical means a case corresponding to any one of the following three cases. First, (1) when in any two kinds of polymer segments the kinds of monomer units contained as the main component are identical to each other, or (2) when 50% or more, 55% or more, 60% or more, 65% or more, 70% or more, 75% or more, 80% or more, 85% or more or 90% or more of monomer unit kinds contained in two kinds of polymer segments are common and a weight ratio deviation of the common monomer units in each polymer segment is within 30%, within 25%, within 20%, within 20%, within 15%, within 10% or within 5%, both polymer segments may be treated as the same. Here, it may be proper that the ratio of the common monomer units is satisfied for both polymer segment modes. For example, if any polymer segment 1 has monomer units of A, B, C, D and F and the other polymer segment 2 has monomer units of D, F, G and H, then the common monomer units in polymer segments 1 and 2 are D and F, where in the position of polymer segment 1 the common ratio is 40% (=100×2/5) because two kinds of the total five kinds are common, but in the position of polymer segment 2 the ratio is 50% (=100× 2/5). Thus, in this case, both polymer segments may be regarded as not identical because the common ratio is not less than 50% only in polymer segment 2. On the other hand, the weight ratio deviation of the common monomers is a percentage of a numerical value in which a large weight ratio minus a small weight ratio is divided by the small weight ratio. For example, in the above case, if the weight ratio of the D monomer units in the segment 1 is about 40% based on 100% of the total weight ratio of the whole monomer units in the segment 1 and the weight ratio of the D monomer units in the segment 2 is about 30% based on 100% of the total weight ratio of the whole monomer units in the segment 2, the weight ratio deviation may be about 33% (=100×(40−30)/30) or so. If the common monomer units are two or more kinds in two segments, in order to be the same segment, it can be considered as the common monomers when the weight ratio deviation within 30% is satisfied for all the common monomers or for the monomer unit as the main component.

In another example, even if the solubility parameter deviation of any two segments is within 30%, within 25%, within 20%, within 20%, within 15%, within 10% or within 5%, both segments can be regarded as the same. The deviation is a percentage of a numerical value in which a large solubility parameter minus a small solubility parameter is divided by the small solubility parameter, as in the case of the weight ratio deviation.

Each polymer segment that is recognized as the same by the above criteria may be a different type of polymer (e.g., any one segment is in the form of a block copolymer and the other segment is in the form of a random copolymer), but it may be, suitably, the same type of polymer.

In the present application, if any one of the three criteria is satisfied, it can be considered as the same. For example, even if the solubility parameter deviation exceeds 30%, it may be the same segment when the ratio of the common monomers is 50% or more and the weight ratio deviation is 30% or less, and vice versa. Conversely, when all the three criteria are not satisfied, they can be regarded as different segments.

In this specification, the inclusion of a certain component as a main component in a subject means a case where the weight ratio of the included component is 55% or more, 60% or more, 65% or more, 70% or more, 75% or more, 80% or more, 85% or more, or 90% or more, and in this case, the upper limit of the ratio is not particularly limited, which may be, for example, about 100%. For example, the fact that a component A is contained as a main component in a component B is a case where the weight of the component A contained in the relevant component B is within the above range, based on the total weight of the component B.

The block copolymer of the present application comprises at least a first polymer segment, a second polymer segment and a third polymer segment. The three segments may be the segments identical to or different from each other, but the case where all three segments are the same is not included.

In one example, the block copolymer may have a star-like structure in which the three polymer segments are covalently bonded to one connecting point while sharing the point. Such a block copolymer is also known in the art as a so-called miktoarm block copolymer. The block copolymer of the present application may also have an additional polymer segment as long as it comprises at least the three segments. In one example, the block copolymer of the present application may have 3 to 10, 3 to 8, 3 to 6, 3 or 4 segments.

In the block copolymer, at least one polymer segment of the three polymer segments may be linked to the connecting point by a so-called cleavable linker. In the present application, the cleavable linker means a linker that can be cleaved by external action such as heat application or light irradiation. Such a linker is variously known.

The applicant has confirmed that in the block copolymer having a star-like structure as above, a self-assembly structure can be formed by linking at least one of the polymer segments by a cleavable linker, and then the relevant self-assembly structure can be changed, as described below. For example, without being limited to theory, it is believed that when the cleavable linker is cleaved through external action after forming the self-assembly structure by applying a block copolymer comprising three segments, a blend of the cleaved segment and the remaining block copolymer is formed and the curvature at an interface of a phase separated in a phase separation structure by the formed blend is changed, whereby the phase separation structure is changed.

Particularly, the applicant has found that by allowing at least any one of the three polymer segments, that is, the first to third polymer segments to contain a vinylpyridine unit, a block copolymer, in which switching between the sphere structure and the cylinder structure is efficiently performed, can be obtained. In particular, the block copolymer having the above structure may be a block copolymer that forms the sphere structure when all three segments are linked to each other, and implements the cylinder structure when the cleavable linker is separated. The segment containing the vinylpyridine unit may comprise the vinylpyridine unit as a main component.

In order to more effectively achieve the action as above, any one of the first to third polymer segments in the block copolymer may be different from the other two polymer segments. In one example, two polymer segments of the first to third polymer segments in the block copolymer may be identical to each other, and the other polymer segment may be different from the two polymer segments. In this structure, the segment linked by the cleavable linker may be any one of the two polymer segments identical to each other. In this case, while the cleaved segment in the blend formed by the cleavage is mixed with any one of the segments of the remaining block copolymer implementing the phase separation structure and is not miscible with the other segment, a new structure of the phase separation structure can be implemented.

The specific kind of each segment in the block copolymer is not particularly limited. For example, the first to third polymer segments may be each selected from the group consisting of a polyvinylpyrrolidone segment, a polylactic acid segment, a polyvinylpyridine segment, a polystyrene segment such as polystyrene or polytrimethylsilylstyrene, a polyalkylene oxide segment such as polyethylene oxide, a polybutadiene segment, a polyisoprene segment, a polyolefin segment such as polyethylene or a poly(alkyl (meth) acrylate) segment such as polymethylmethacrylate to satisfy the above conditions.

In one example, the polymer segment different from the two polymer segments may be a polymer segment including the vinylpyridine unit. Also, in this case, the two polymer segments different from the polymer segment including the vinylpyridine unit may each comprise a styrene unit, and such a styrene unit may be included as a main component.

In the present application, the type of the cleavable linker linking the polymer segment is not particularly limited, and a known cleavable linker can be applied. For example, the linker is a photocleavable linker, which may be a linker including a 2-nitrobenzyl group, a coumarinyl group, a pyrenylalkyl group, and the like as the known linker. Linkers of this kind are variously known, and the method of linking segments by applying such a linker is also known. In the present application, a suitable linker may be selected among these known linkers without limitation and used.

The block copolymer may have a number average molecular weight (Mn) in a range of, for example, 1000 to 1000000. In this specification, the term number average molecular weight is a converted value for standard polystyrene measured using GPC (gel permeation chromatograph), and the term molecular weight herein means a number average molecular weight, unless otherwise specified. In another example, the molecular weight (Mn) may be, for example, 5000 or more, 10000 or more, 50000 or more, 100000 or more, 300000 or more, 400000 or more, or 500000 or more. In another example, the molecular weight (Mn) may be 900,000 or less, 800,000 or less, or 700,000 or less or so. The block copolymer may have a polydispersity (Mw/Mn) in a range of 1.01 to 2. In another example, the polydispersity may be about 1.05 or more, or about 1.1 or more. In another example, the polydispersity may be about 1.5 or less.

In this range, the block copolymer can exhibit proper self-assembly properties. The number average molecular weight of the block copolymer or the like can be adjusted in consideration of the desired self-assembly structure or the like.

When the block copolymer comprises at least the first to third segments, the ratio of each segment in the block copolymer is not particularly limited, which may be appropriately selected in consideration of the desired self-assembly properties. For example, as described above, when any two of the first to third segments are the same segment and the other is a different segment, the ratio of the one different segment in the block copolymer may be in a range of 10 mol % to 90 mol %.

The method for producing the block copolymer of the present application is not particularly limited, and a known method can be applied.

For example, the block copolymer can be produced by a CLP (controlled/living polymerization) method using monomers forming each segment. For example, there are anionic polymerization in which the block copolymer is synthesized in the presence of an inorganic acid salt such as an alkali metal or an alkali earth metal by using an organic rare earth metal complex as a polymerization initiator or by using an organic alkali metal compound as a polymerization initiator, an anionic polymerization method in which the block copolymer is synthesized in the presence of an organic aluminum compound by using an organic alkali metal compound as a polymerization initiator, an atom transfer radical polymerization method (ATRP) using an atom transfer radical polymerization agent as a polymerization initiator, an ARGET (Activators Regenerated by Electron Transfer) atom transfer radical polymerization method (ATRP), which uses an atom transfer radical polymerization agent as a polymerization initiator, but performs polymerization under an organic or inorganic reducing agent that generates electrons, an ICAR (Initiators for Continuous Activator Regeneration) atom transfer radical polymerization method, a polymerization method by reversible addition-fragmentation chain transfer (RAFT) using an inorganic reducing agent and a reversible addition-fragmentation chain transfer agent or a method of using an organotellurium compound as an initiator, and the like, and a suitable method may be selected among these methods and applied.

In this process, an initiator, a chain transfer agent or a block copolymer, to which a protective group or the like is applied, may be applied to form a star-like structure, and a known process for introducing a cleavable linker may also be performed.

The present application also relates to a polymer membrane comprising the block copolymer. The polymer membrane may be used for various applications, and for example, may be used for various electric or electronic elements, a process of forming the pattern, a recording medium such as a magnetic storage medium and a flash memory, or a biosensor, and the like.

In one example, the block copolymer in the polymer membrane may implement a periodic structure including a sphere, a cylinder, a gyroid, a lamella, or the like through self-assembly.

For example, the first or second segment in the block copolymer or another segment in the other segments covalently bonded thereto may form a regular structure such as a lamellar shape or a cylinder shape.

In one example, the phase separation structure in the block copolymer may be a structure in which two or more of the above-described structures exist together. As described above, such a structure can be formed through a process of cleaving the cleavable linker after forming the self-assembly structure once by applying the block copolymer of the present application. Therefore, in this case, one segment of the first to third polymer segments may be mixed in the cleaved state with the block copolymer comprising two other segments in the polymer membrane.

In one example, a sphere structure may be implemented in a state or part where the first to third segments are all connected in the polymer membrane, and a cylinder structure may be implemented in a state or part where one of the first to third polymer segments in the cleaved state is mixed with the block copolymer containing the other two segments.

Here, the polymer segment in the cleaved state which is mixed with the block copolymer containing the other two segments may be a segment containing a styrene unit.

The present application also relates to a method for forming a polymer membrane using the block copolymer. The method may comprise forming a polymer membrane comprising the block copolymer in a self-assembled state on a substrate. For example, the method may comprise a process of forming a layer of the block copolymer or a coating liquid in which the block copolymer is diluted in an appropriate solvent on the substrate by application or the like, and, if necessary, aging or heat-treating the layer.

The aging or heat treatment may be performed based on, for example, the phase transition temperature or the glass transition temperature of the block copolymer, and may be performed at, for example, a temperature above the glass transition temperature or the phase transition temperature. The time for which this heat treatment is performed is not particularly limited, and the treatment can be performed within a range of, for example, about 1 minute to 72 hours, but the time can be changed as needed. The heat treatment temperature of the polymer thin membrane may be, for example, about 100° C. to 250° C., but this may be changed in consideration of the block copolymer to be used.

In another example, the formed layer may also be subjected to solvent aging in a non-polar solvent and/or a polar solvent at room temperature for about 1 minute to 72 hours.

In one example, the method for forming a polymer membrane may comprise steps of: implementing a first phase separation structure using the above-described block copolymer; and cleaving a cleavable linker of the block copolymer implementing the first phase separation structure, and as described above, a second phase separation structure different from the first phase separation structure may be formed in the polymer membrane by the cleaving step. In this case, the method of cleaving the cleavable linker is not particularly limited, and an appropriate method can be selected in consideration of the kind of the linker applied.

In one example, the first phase separation structure may be a sphere structure and the second phase separation structure may be a cylinder structure.

Such a cleavage may be performed entirely in the polymer membrane, or may also be performed only for a part through masking or the like. Each of the first and second phase separation structures may be selected as any one selected from the group consisting of sphere, cylinder, gyroid and lamella structures.

The present application also relates to a patterning method. For example, the method may comprise a process of selectively removing any one segment of the block copolymer from a laminate having a substrate, and the polymer membrane formed on the surface of the substrate and comprising the self-assembled block copolymer. The method may be a method of forming a pattern on the substrate. For example, the method may comprise forming a polymer membrane comprising the block copolymer on a substrate, selectively removing one or more blocks of the block copolymer present in the membrane, and then etching the substrate. In this way, it is possible to form, for example, a nanoscale fine pattern. In addition, various types of patterns such as nano-rods or nano-holes can be formed through the above-described method depending on the shape of the block copolymer in the polymer membrane. If necessary, a copolymer different from the block copolymer or a homopolymer, and the like may be mixed for pattern formation. The type of the substrate to be applied to this method is not particularly limited and may be selected as needed, and for example, silicon oxide or the like may be applied.

For example, the method can form a nanoscale pattern of silicon oxide exhibiting a high aspect ratio. For example, after forming the polymer membrane on silicon oxide and selectively removing any one block of the block copolymer in a state where the block copolymer in the polymer membrane forms a predetermined structure, the silicon oxide may be etched by various ways, for example, reactive ion etching or the like to realize various shapes including patterns of nano-rods or nano-holes, and the like.

The method of selectively removing any one segment of the block copolymer in the above method is not particularly limited, and for example, a method of removing a relatively soft block by irradiating the polymer membrane with an appropriate electromagnetic wave, for example, ultraviolet rays or the like, can be used. In this case, the ultraviolet irradiation condition is determined according to the type of the block of the block copolymer, and the method can be performed, for example, by being irradiated with ultraviolet rays having a wavelength of about 254 nm for 1 minute to 60 minutes.

In addition, following the ultraviolet irradiation, a step of treating the polymer membrane with an acid or the like to further remove the segment decomposed by ultraviolet rays may also be performed.

Furthermore, the step of etching the substrate using the polymer membrane in which the blocks are selectively removed as a mask is not particularly limited, which may be performed, for example, through a reactive ion etching step using $CF_4/Ar$ ions or the like and following this process, a step of removing the polymer membrane from the substrate by an oxygen plasma treatment or the like may also be performed.

Advantageous Effects

The present application may provide a block copolymer and a use thereof. The block copolymer of the present application may have excellent self-assembly properties or phase separation characteristics and simultaneously have characteristics capable of changing the self-assembly structure formed once, or provide a block copolymer capable of forming a pattern of phase separation structures in a polymer membrane.

MODE FOR INVENTION

Hereinafter, the present application will be described in detail by way of examples, but the scope of the present application is not limited by the following examples.

1. NMR Measurement

NMR analyses were performed at room temperature using an NMR spectrometer including a Varian Unity Inova (500 MHz) spectrometer with a triple resonance 5 mm probe. The analytes were diluted to a concentration of about 10 mg/ml in a solvent for NMR measurement ($CDCl_3$), and chemical shifts were expressed in ppm.

<Applied Abbreviation>
br=broad signal, s=singlet, d=doublet, dd=double doublet, t=triplet, dt=double triplet, q=quartet, p=quintet, m=multiplet.

2. GPC (Gel Permeation Chromatograph)

The number average molecular weight (Mn) and the molecular weight distribution were measured using GPC (gel permeation chromatography). Into a 5 mL vial, an analyte such as block copolymers of Examples or Comparative Examples or a giant initiator is put and diluted in THF (tetrahydrofuran) to be a concentration of about 1 mg/mL or so. Then, a standard sample for calibration and a sample to be analyzed were filtered through a syringe filter (pore size: 0.45 μm) and then measured. As the analytical program, ChemStation from Agilent Technologies was used, and the elution time of the sample was compared with the calibration curve to obtain the weight average molecular weight (Mw) and the number average molecular weight (Mn), respectively, and the molecular weight distribution (PDI) was calculated by the ratio (Mw/Mn) thereof. The measurement conditions of GPC are as follows.

<GPC Measurement Condition>
Instrument: 1200 series from Agilent Technologies
Column: using two PLgel mixed B from Polymer Laboratories
Solvent: THF
Column temperature: 35° C.
Sample concentration: 1 mg/mL, 200 uL injection
Standard sample: polystyrene (Mp: 3900000, 723000, 316500, 52200, 31400, 7200, 3940, 485)

Preparation Example 1

Figure 1:
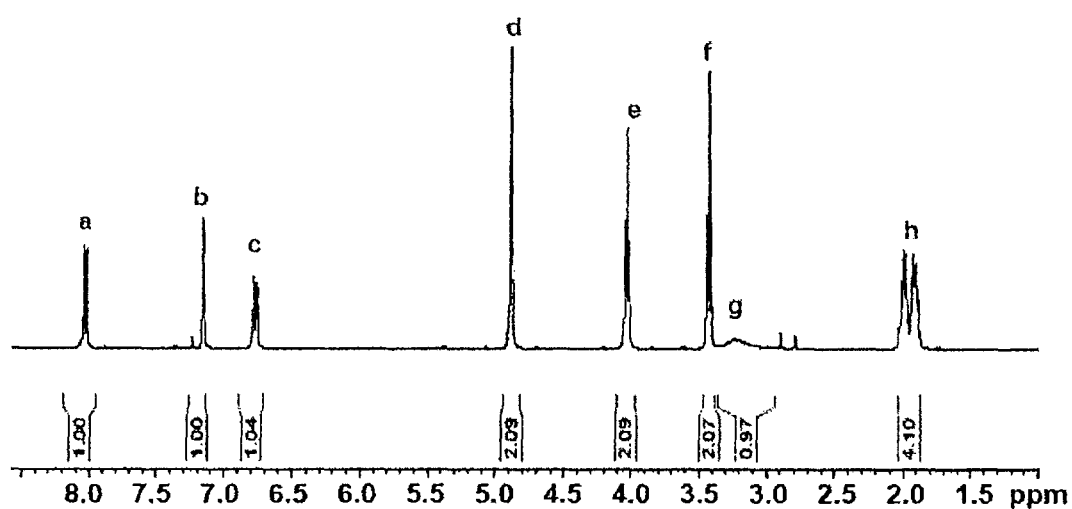
FIGS. 1 to 10 are analysis results for compounds or polymers produced in Preparation Examples.

A compound of Formula 1 below (5-(4-bromobutoxy)-2-nitrophenyl)methanol) was prepared in the following manner. 5 g (29.6 mmol) of 5-hydroxy-1-nitrobenzyl alcohol was dissolved in 200 mL of acetonitrile and then an aqueous solution of sodium hydride (2.16 g, 90 mmol) was added thereto while stirring at 0° C. The resulting yellow precipitate was filtered and dissolved in DMF (150 mL). After completely dissolving it, dibromobutane (7.03 g, 32.56 mmol) was slowly added at room temperature. After reaction for 12 hours, distilled water was poured to terminate the reaction and the reactant was extracted with ethyl acetate. The extract was purified by column chromatography to obtain the compound of Formula 1 below. The attached FIG. 1 is an analysis result for the compound.

[Formula 1]

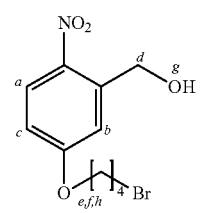

<NMR Analysis Result>
$^1$H-NMR (400 MHz, $CDCl_3$): d8.06 (d, 1H); d7.12 (s, 1H); d6.78 (d, 1H); d4.88 (s, 2H); d4.02 (t, 2H); d3.32 (t, 2H); d3.20 (s, 1H); d1.98 (p, 2H); d1.90 (p, 2H).

Preparation Example 2

Figure 2:
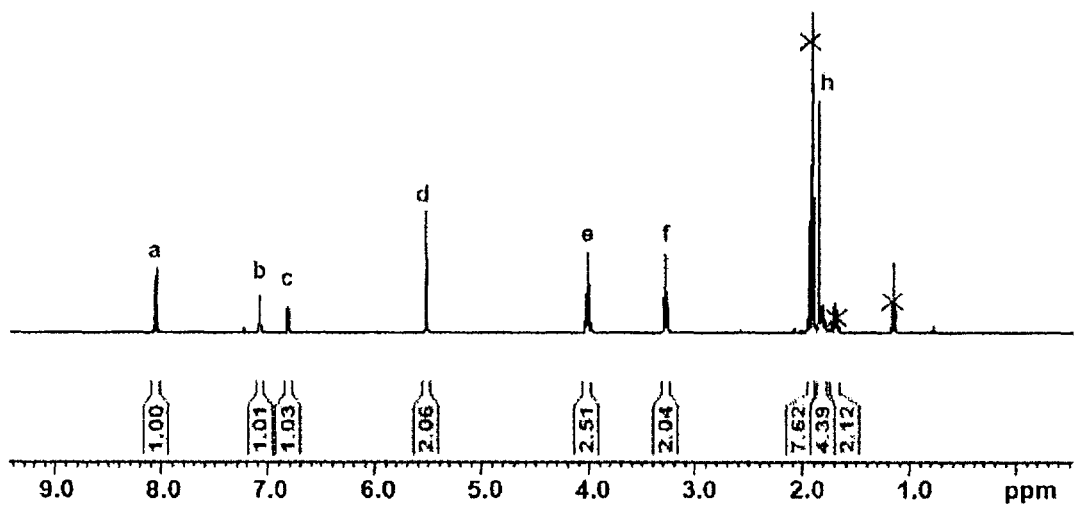

A compound of Formula 2 below (5-(4-azidobutoxy)-2-nitrophenyl)methanol) was prepared in the following manner. The compound of Formula 1 (8.5 g, 27.9 mmol) in Preparation Example 1 and sodium azide (2.36 g, 36.3 mmol) were dissolved in a mixed solvent of acetone and distilled water (6:1) and refluxed at 65° C. in a nitrogen atmosphere to obtain a target product. The attached FIG. 2 is an analysis result for the compound.

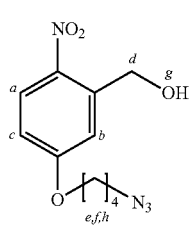

[Formula 2]

<NMR Analysis Result>
$^1$H-NMR (400 MHz, CDCl$_3$): d8.06 (d, 1H); d7.12 (s, 1H); d6.78 (d, 1H); d5.52 (s, 2H); d4.02 (t, 2H); d3.32 (t, 2H); d3.20 (s, 1H); d1.98 (p, 2H); d1.90 (p, 2H).

Preparation Example 3

Figure 3:
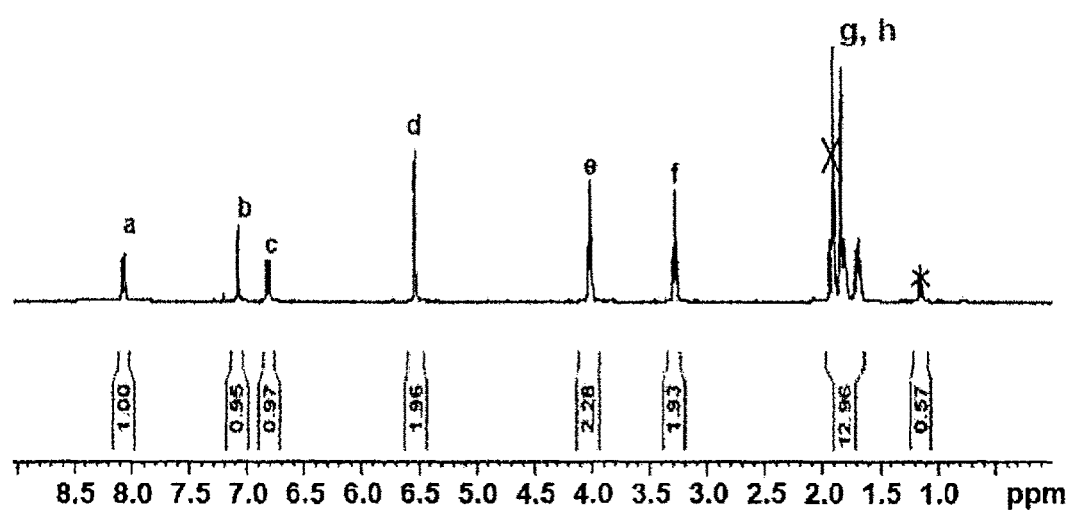

A compound of Formula 3 below (5-(4-azidobutoxy)-2-nitrophenyl 2-bromo-2-methylpropanoate) was prepared in the following manner. The compound of Formula 2 (7.19 g, 27.0 mmol) in Preparation Example 2 was dissolved in THF (Tetrahydrofuran) and 2-bromo-2-methylpropanoyl bromide (7.45 g, 32.4 mmol) was added while stirring with triethylamine (3.24 g, 32.0 mmol) in a nitrogen atmosphere at 40° C. The salt generated during the reaction was filtered off and the residue was purified by column chromatography to obtain the compound of Formula 3 below. FIG. 3 is an analysis result for the compound.

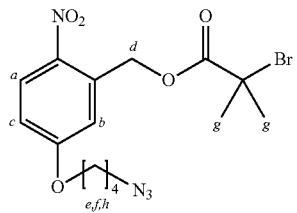

[Formula 3]

<NMR Analysis Result>
$^1$H-NMR (400 MHz, CDCl$_3$): d8.06 (d, 1H); d7.12 (s, 1H); d6.78 (d 1H); d5.52 (s, 2H); d4.02 (t, 2H); d3.32 (t, 2H); d1.99 (s, 6H); d1.98 (p, 2H); d1.90 (p, 2H).

Preparation Example 4

Figure 4:
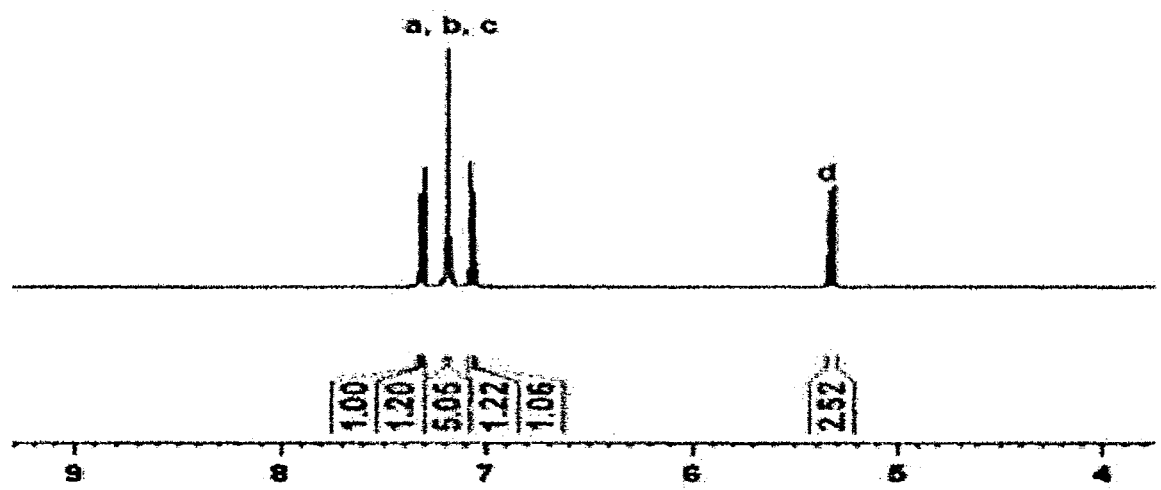

A compound of Formula 4 below (1-bromo-4-(1-phenylvinyl)benzene) was prepared in the following manner. Methyltriphenylphosphonium bromide (7.2 g, 20 mmol) and potassium tert-butoxide (2.3 g, 20 mmol) were put into THF (tetrahydrofuran) (50 mL), and THF (tetrahydrofuran) (35 mL) in which p-bromobenzophenone (3.4 g, 17 mmol) was dissolved was slowly added while stirring at room temperature, and the mixture was reacted for 3 hours. After reaction, a saturated aqueous solution of ammonium chloride was added to terminate the reaction and the reaction mixture was extracted with diethyl ether to obtain the compound of Formula 4 as a product. FIG. 4 is an analysis result for the compound.

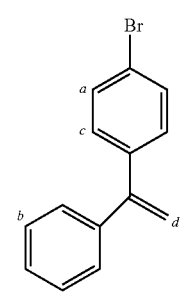

[Formula 4]

<NMR Analysis Result>
$^1$H-NMRt (400 MHz, CDCl$_3$): d7.33 (d, 2H); d7.19 (d, 5H); d7.05 (d, 2H); d5.32 (d, 2H).

Preparation Example 5

Figure 5:
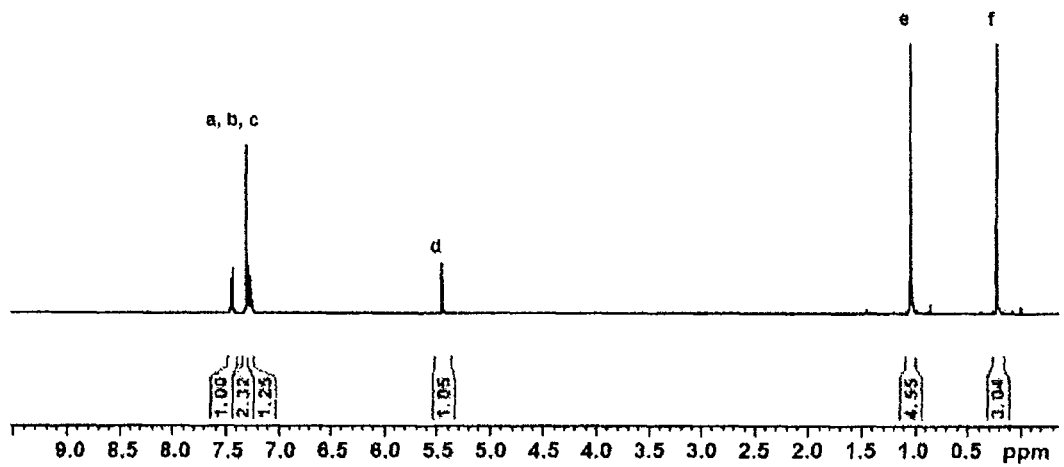

A compound of Formula 5 below (tert-butyldimethyl((4-(1-phenylvinyl)phenyl)ethynyl)silane) was prepared in the following manner. The compound of Formula 4 (3.89 g, 15 mmol) in Preparation Example 4 was completely dissolved in piperidine (50 mL) and then tert-butyldimethylsilylacetylene (2.53 g, 18 mmol) was added thereto. Then, the reaction was carried out at 50° C. for 24 hours, followed by filtering and extraction with hexane, and then the extract was purified by column chromatography to obtain the compound of Formula 5. FIG. 5 is an analysis result for the compound.

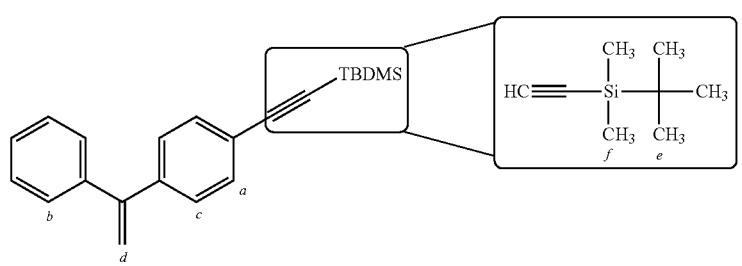

[Formula 5]

<NMR Analysis Result>
$^1$-NMR (400 MHz, CDCl$_3$): d7.33 (d, 2H); d7.19 (d, 5H); d7.05 (d, 2H); d5.32 (d, 2H); d1.03(s, 9H); d0.22(d, 6H).

Preparation Example 6

Figure 6:
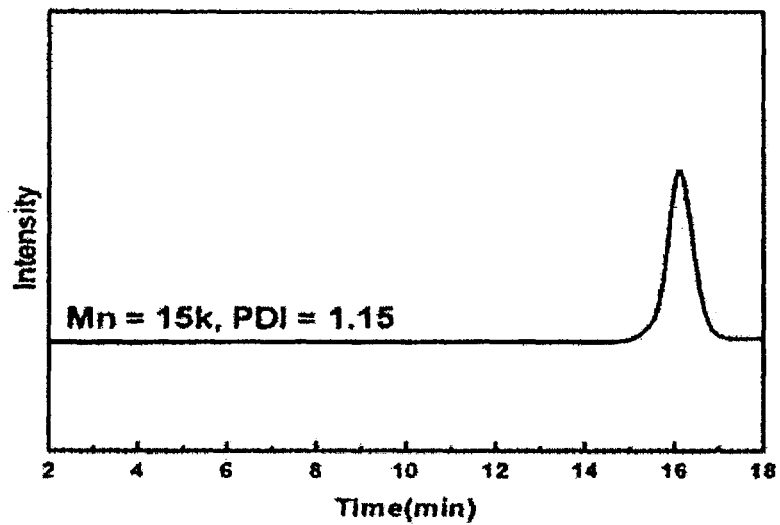

A polymer (A) of Formula 6 below was synthesized. The compound of Formula 3 (50 mg) in Preparation Example 3 was used as an initiator, and a reaction solution in which styrene (6 mL), copper (I) bromide (18 mg) and PMDETA (N,N,N',N'',N''-pentamethyldiethylenetriamine, 24 μL) were mixed was freeze-thawed three times and polymerized while stirring at 90° C. under a nitrogen atmosphere. The polymer solution was passed through an alumina column to remove the catalyst and precipitated in methanol to obtain a powder of the polymer (A). The polymer (A) had a number average molecular weight (Mn) of about 12,000 and a molecular weight distribution (Mw/Mn) of about 1.18. FIG. 6 shows the measurement result of the polymer (A).

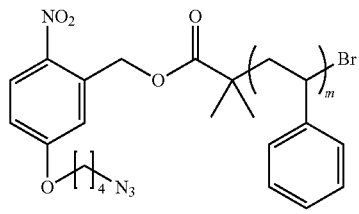

[Formula 6]

Preparation Example 7

Figure 7:
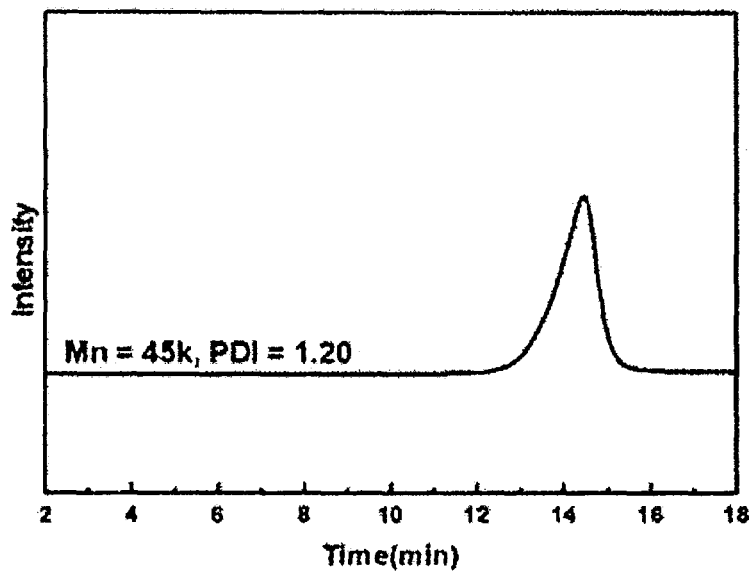

A polymer (B) of Formula 7 below was synthesized. Lithium chloride (0.3 g) and THF (80 mL) were put into a reactor in an argon atmosphere and stirred at −78° C. so that they were sufficiently dissolved. Subsequently, 86 μL of a sec-butyl lithium solution at a concentration of 1.2 M was added and the purified styrene (3.0 g) was added thereto. After sufficiently stirring for about 1 hour, the compound of Formula 5 in Preparation Example 5 was added. Then, 2-vinylpyridine (2VP) (1.25 g) was added and stirred for about 1 hour or so, and then the reaction was terminated using 2-propanol to obtain the polymer (B). The polymer (B) had a number average molecular weight (Mn) of about 45000 and a molecular weight distribution (Mw/Mn) of about 1.20. Furthermore, the mass fraction of the polystyrene segment in the polymer (B) was about 72%. FIG. 7 is the GPC measurement result for the polymer (B).

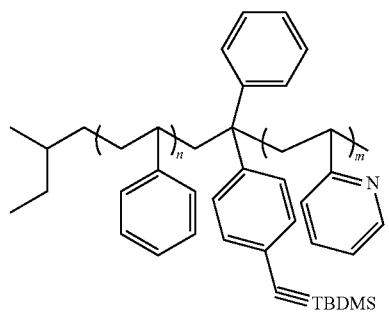

[Formula 7]

Preparation Example 8

Figure 8:
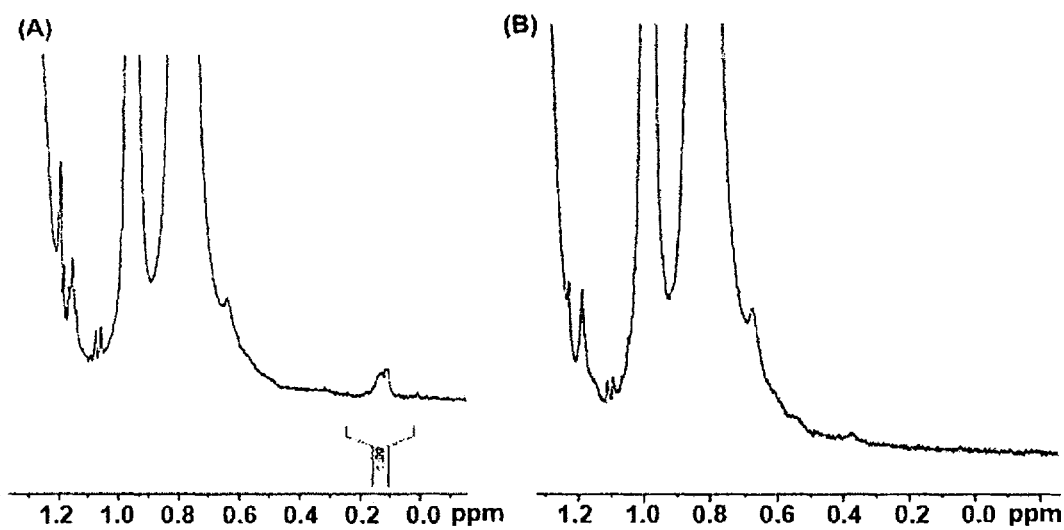

A polymer (C) of Formula 8 below in which TBDMS as a protecting group was removed from the polymer (B) of Formula 7 above was synthesized. The polymer (B) of Preparation Example 7 was completely dissolved in THF and sufficiently degassed with nitrogen, and 10 mL of a solution of tetrabutylammonium fluoride (1.0 M in THF) was added thereto and stirred at room temperature for 12 hours. After reaction, THF was removed and the solvent was changed to chloroform, and the reactant was purified through column chromatography. As shown in FIG. 8, it was confirmed that the peak of d=0.2 corresponding to Si(CH$_3$) contained in the protecting group in the polymer (B) disappeared through the above reaction.

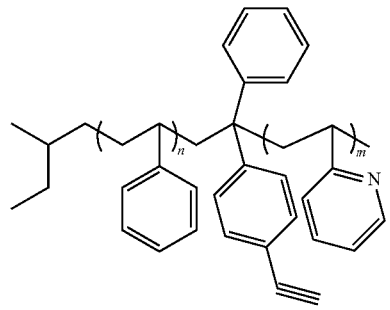

[Formula 8]

Preparation Example 9

Figure 9:
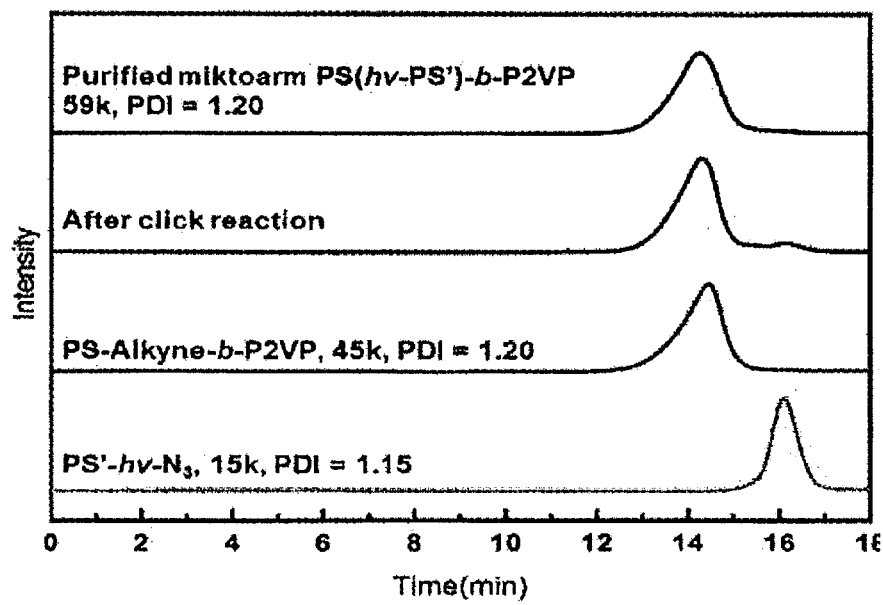
Figure 10:
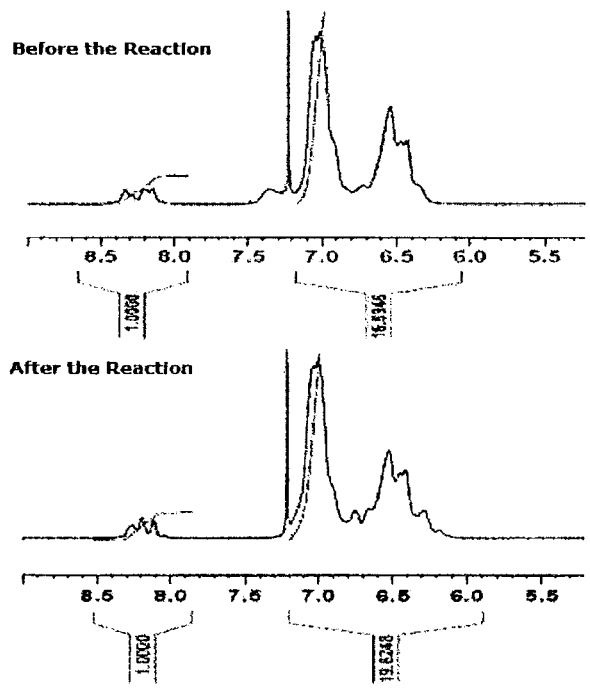

The polymer (A) and the polymer (C) were coupled to synthesize a miktoarm block copolymer (polymer (D)) having three polymer segment arms. 0.1 g (1.2 eq.) of the polymer (A) and 0.25 g (1.0 eq) of the polymer (C) were sufficiently dissolved in 5 mL of THF and then degassed with nitrogen. After putting PMDETA (N,N,N',N'',N''-pentamethyldiethylenetriamine, 24 mL) and copper (I) bromide (18 mg) into a reactor in sequence, the reactor was sealed and stirred at room temperature for 2 days, and then the remaining polymer (A) was removed through purification to obtain the polymer (D). The polymer (D) had a number average molecular weight (Mn) of about 60000 and a molecular weight distribution (Mw/Mn) of about 1.20. Furthermore, the mass fraction of the polystyrene segment in the polymer (D) was about 80%. FIG. 9 is the GPC measurement result for the polymer (D), and FIG. 10 is the results of comparing NMR before and after the reaction.

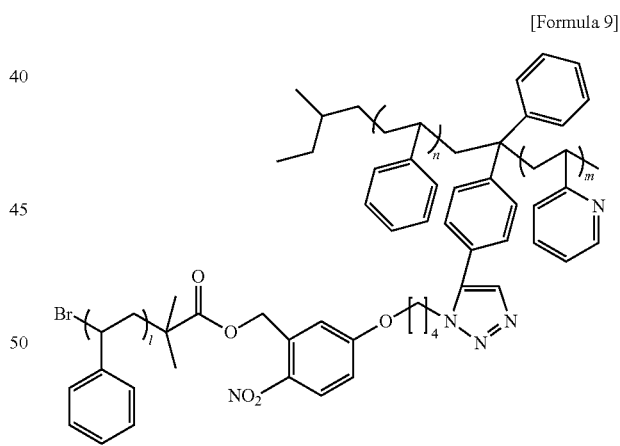

[Formula 9]

Example 1

Figure 11:
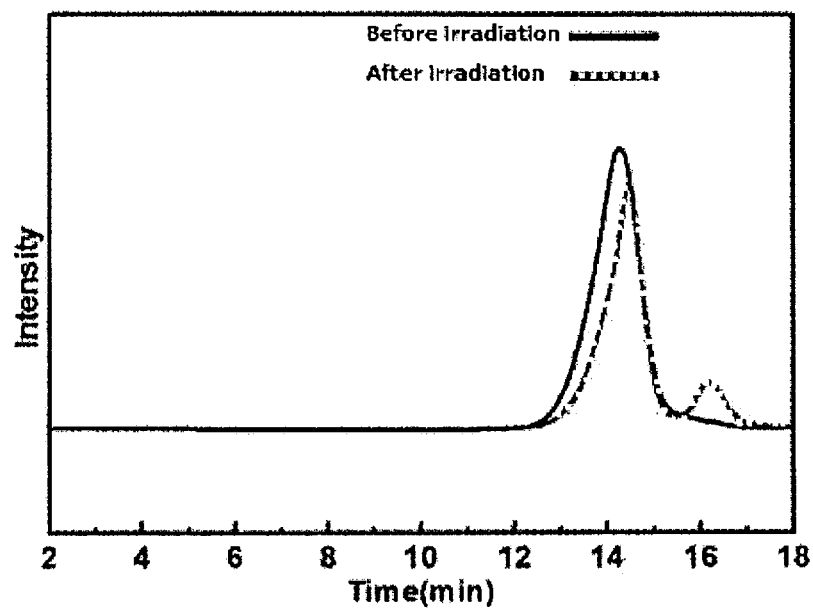
FIG. 11 is a GPC curve for a polymer (D) before and after ultraviolet irradiation in Example 1.
Figure 12:
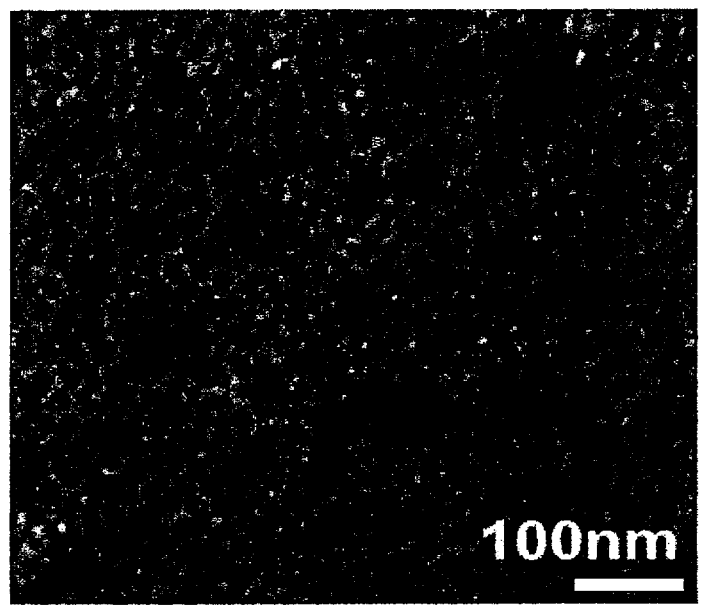
FIG. 12 is a TEM image of a sample before ultraviolet irradiation for a polymer (D) of Example 2.
Figure 13:
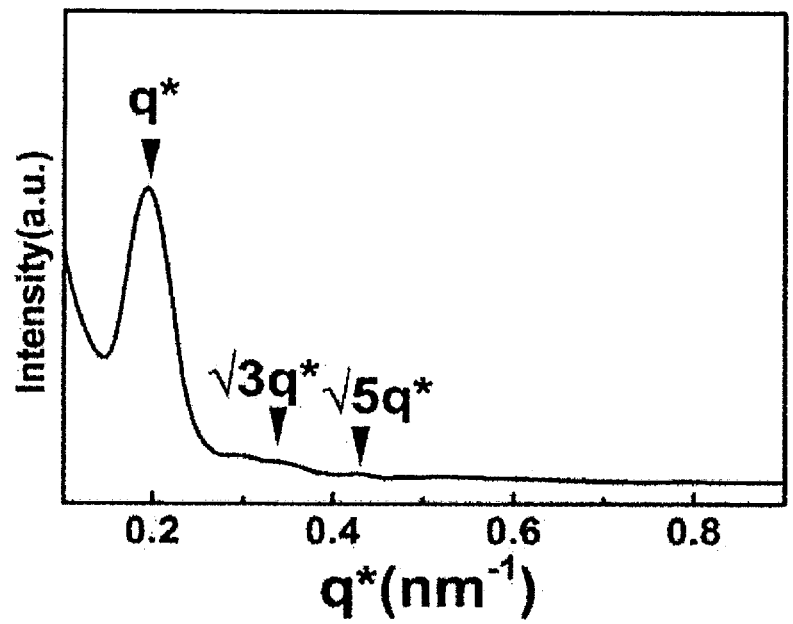
FIG. 13 is a SAXS graph of a sample before ultraviolet irradiation for a polymer (D) of Example 2.
Figure 14:
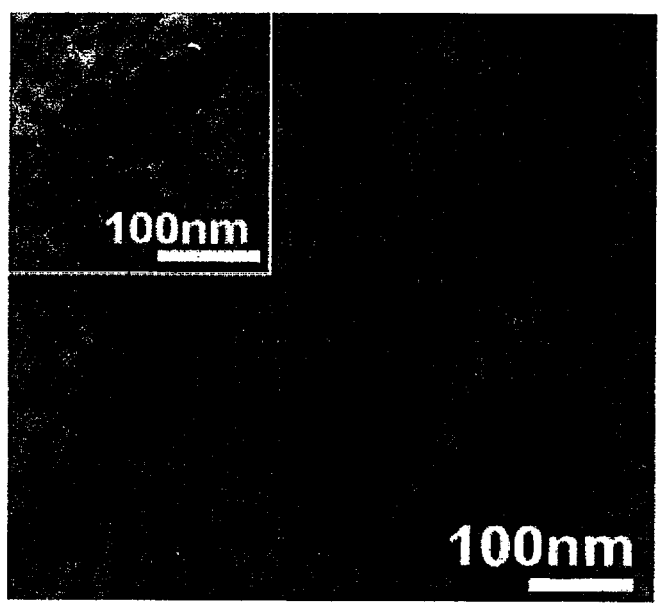
FIG. 14 is a TEM image of a sample after ultraviolet irradiation for a polymer (D) of Example 2, where a small image at the upper left is a TEM image taken in a vertical direction.
Figure 15:
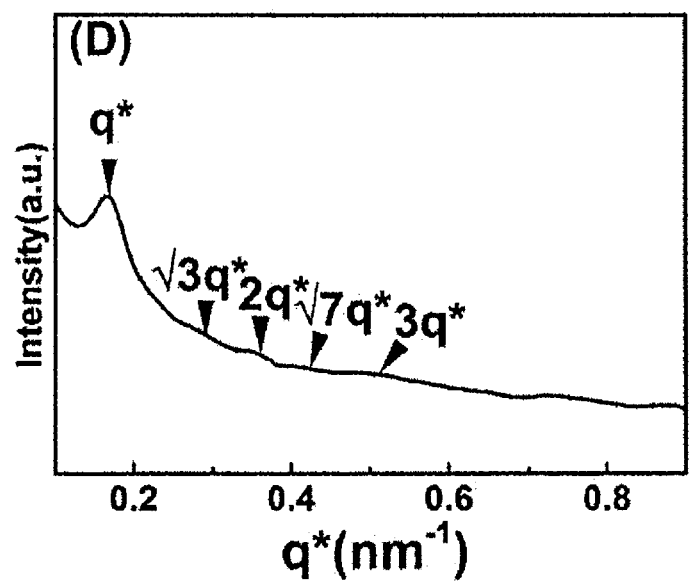
FIG. 15 is a SAXS graph of a sample after ultraviolet irradiation for a polymer (D) of Example 2.

10 mg of the polymer (D) was dissolved in THF (5 mL), coated on a glass substrate, and irradiated with ultraviolet rays having a wavelength of about 365 nm. It was confirmed that after irradiation of ultraviolet rays for 1 hour, the light split linker of the polymer (D) was decomposed and thus the polymer was completely decomposed into a derivative of the polymer (A) and a derivative of the polymer (C). Furthermore, as a result of analyzing the decomposed polymers by GPC, the peaks corresponding to the derivative of the polymer (A) and the derivative of the polymer (C) were confirmed (FIG. 11).

Example 2

10 mg of the polymer (D) was dissolved in THF (5 mL) and subjected to solvent drop casting to prepare two samples, where one sample was not irradiated with ultraviolet rays and the other sample was irradiated with ultraviolet rays having a wavelength of about 365 nm. Subsequently, the two samples were each annealed at about 230° C. for 3 days or so and subjected to microtomy to prepare TEM (transmission electron microscopy) specimens, in which the TEM was confirmed using the specimens, and for the two samples, SAXS (small angle X-ray scattering) analysis was also performed. As a result of confirmation, the microphase separation structure of cylinder morphology was observed in the sample not irradiated with ultraviolet rays of the two samples. The results of the measurement results were shown in FIGS. 12 to 15.

Example 3

Figure 16:
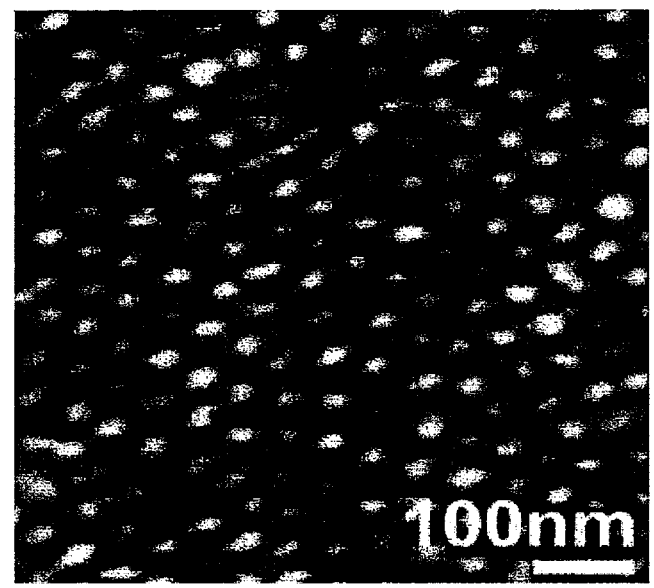
FIG. 16 is a cross-sectional AFM image of a thin membrane sample before ultraviolet irradiation for a polymer (D) in Example 3.
Figure 17:
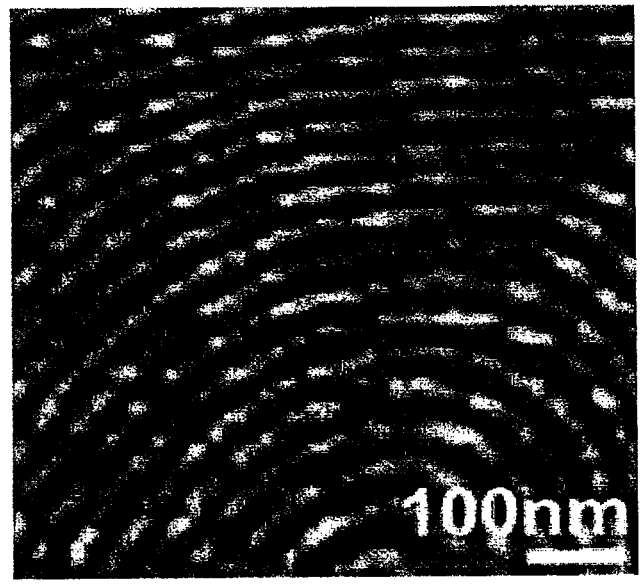
FIG. 17 is a cross-sectional AFM image of a thin membrane sample after ultraviolet irradiation for a polymer (D) in Example 3.

The polymer (D) was spin-coated on a silicon substrate to prepare a polymer thin membrane sample having a thickness of about 60 nm. Then, a part of the sample was not irradiated with ultraviolet rays and the other part was irradiated with ultraviolet rays having a wavelength of about 365 nm. Subsequently, the sample was annealed and observed by AFM (atomic force microscopy), and as a result, a sphere microphase separation structure was confirmed in the part not irradiated with ultraviolet rays, and a cylinder microphase separation structure horizontally oriented on the substrate was confirmed in the part irradiated with ultraviolet rays. The measurement results were shown in FIGS. 16 and 17.

Example 4

Trench structures were formed on a silicon wafer substrate in the following manner. A layer of $SiO_2$ was formed on the substrate to a thickness of about 200 nm by a known deposition method. Subsequently, a BARC (bottom anti-reflective coating) was coated on the $SiO_2$ layer to a thickness of about 60 nm and a PR (photoresist) layer (for KrF, positive-tone resist layer) was again coated thereon to a thickness of about 400 nm or so. Subsequently, the PR layer was patterned by a KrF stepper exposure method. Subsequently, the BARC layer and the $SiO_2$ layer were etched using the patterned PR layer as a mask by an RIE (reactive ion etching) method, and the residues of the BARC layer and the PR layer were removed to form mesa structures. The spacing (D) between the mesa structures formed in this manner was about 150 nm, the height (H) was about 50 nm, and the width (W) of each mesa structure was about 150 nm.

Figure 18:
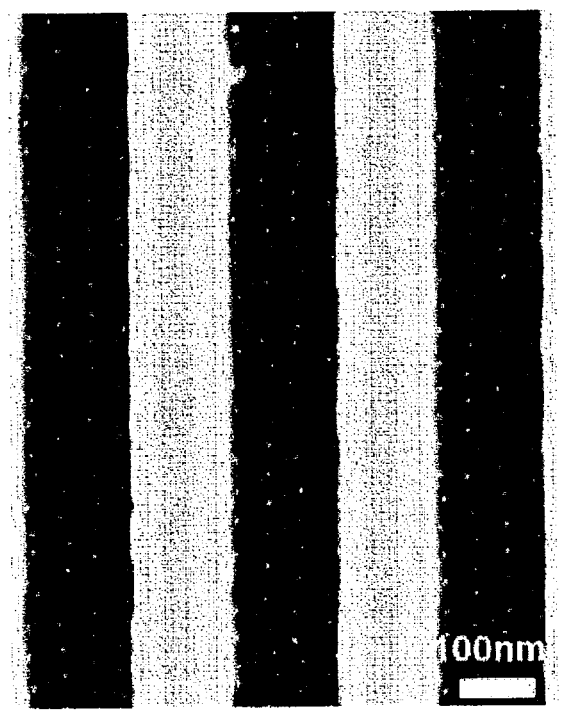
FIG. 18 is an SEM image that before ultraviolet irradiation for a polymer (D) in Example 4, a thin membrane sample has been transferred to metal nanoparticles.
Figure 19:
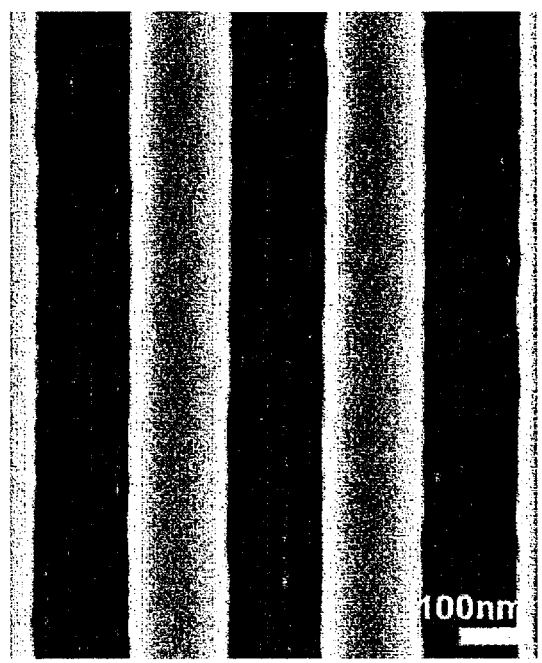
FIG. 19 is an SEM image that after ultraviolet irradiation for a polymer (D) in Example 4, a thin membrane sample has been transferred to metal nanowire.

The polymer (D) was spin-coated on the mesa structures (trench structures) of the substrate formed in the above manner to prepare a polymer membrane sample having a thickness of about 60 nm or so. Subsequently, a part of the sample was not irradiated with ultraviolet rays and the other part was irradiated with ultraviolet rays having a wavelength of about 365 nm or so, and then annealed. The thin membrane with two microphases was immersed in an acid solution (HCl solution, 1%), in which the metal salt (Na2PtCL4) was dissolved, for 3 hours. Subsequently, by removing the polymer by O2 RIE and simultaneously reducing the metal salt, two nanostructures of platinum nanoparticles and platinum nanowires could be obtained. SEM (scanning electron microscopy) results for this were shown in FIGS. 18 and 19.

The invention claimed is:

1. A block copolymer comprising:
a first polymer segment;
a second polymer segment; and
a third polymer segment,
wherein the block copolymer has a star-like structure that the first to third polymer segments are covalently bonded to one connecting point while sharing the connecting point, a linker connecting at least one polymer segment of the three polymer segments to the connecting point is a cleavable linker, and
wherein at least one of the first to third polymer segments comprises a vinylpyridine unit.

2. The block copolymer according to claim 1, wherein, in two polymer segments of the first to third polymer segments, 50% or more of monomer units are identical to each other and a difference of the same monomer in the corresponding segments is within 20 wt %, or a deviation of solubility parameter in each polymer segment is within 30%, and
wherein the other polymer segment is different from the two polymer segments, and the polymer segment different from the two polymer segments comprises a vinylpyridine unit.

3. The block copolymer according to claim 2, wherein in the two polymer segments, 50% or more of monomer units are identical to each other and a difference of the same monomer in the corresponding segments is within 20 wt %.

4. The block copolymer according to claim 2, wherein in the two polymer segments, a deviation of solubility parameter in each polymer segment is within 30%.

5. The block copolymer according to claim 2, wherein any one of the two polymer segments is linked to the connecting point by the cleavable linker.

6. The block copolymer according to claim 1, wherein any one of the first to third polymer segments comprises a vinylpyridine unit and the other two segments comprise styrene units.

7. The block copolymer according to claim 1, wherein the cleavable linker comprises a 2-nitrobenzyl group, a coumarinyl group or a pyrenylalkyl group.

8. The block copolymer according to claim 1, wherein a number average molecular weight is in a range of 1,000 to 1,000,000.

9. The block copolymer according to claim 1, wherein a molecular weight distribution is in a range of 1.01 to 2.

10. A polymer membrane comprising the block copolymer of claim 1, wherein the block copolymer is self-assembled.

11. The polymer membrane according to claim 10, wherein two or more phase separation structures selected from the group consisting of sphere, cylinder, gyroid and lamella structures are simultaneously present.

12. The polymer membrane according to claim 10, wherein one segment of the first to third polymer segments in the block copolymer is mixed in the cleaved state with the block copolymer comprising the other two segments.

13. The polymer membrane according to claim 12, wherein the polymer segment in the cleaved state comprises a styrene unit.

14. A method for forming a polymer membrane comprising the block copolymer of claim 1 on a substrate, wherein the block copolymer is self-assembled, comprising
implementing a first phase separation structure using the block copolymer of claim 1; and
cleaving the cleavable linker of the block copolymer implementing the first phase separation structure,
wherein a second phase separation structure different from the first phase separation structure is formed in the polymer membrane after the cleaving step.

15. The method for forming a polymer membrane according to claim 14, wherein the first phase separation structure comprises a sphere structure and the second phase separation structure comprises a cylinder structure.

* * * * *